Sept. 15, 1936.  E. M. TUCKER  2,054,308
SEALING COLLAR
Filed Oct. 9, 1934
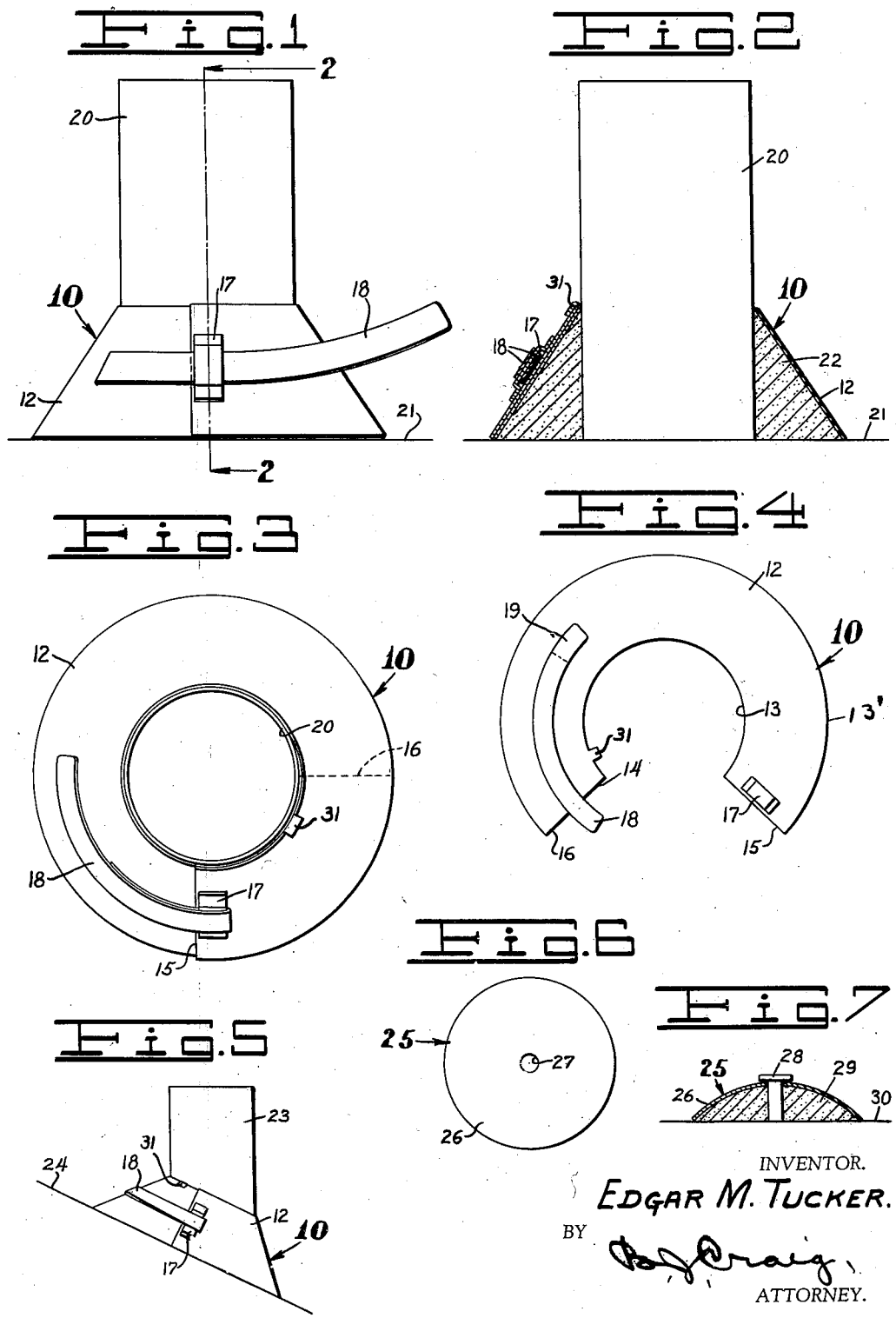
INVENTOR.
EDGAR M. TUCKER.
BY
ATTORNEY.

Patented Sept. 15, 1936

2,054,308

UNITED STATES PATENT OFFICE 2,054,308

SEALING COLLAR

Edgar M. Tucker, South Pasadena, Calif., assignor of one-half to Willis M. Fabry, Alhambra, Calif.

Application October 9, 1934, Serial No. 747,560

2 Claims. (Cl. 285—31)

This invention relates to improvements in sealing devices.

The general object of the invention is to provide an improved, novel, sealing collar to prevent leakage around a pipe, bar, conduit, etc., where it passes through a wall or roof.

Another object of the invention is to provide a sealing collar which is adjustable to fit various sized devices with which it is associated.

Other objects and the advantages of this invention will be apparent from the following description when in connection with the accompanying drawing wherein:—

Fig. 1 is a side elevation of my improved sealing collar showing it operatively installed and showing the locking strap before it is bent to a holding position.

Fig. 2 is a section taken on line 2—2 of Fig. 1.

Fig. 3 is a top plan view of the device shown in Fig. 1, showing the locking strap in a holding position.

Fig. 4 is a top view of the sealing collar blank on a reduced scale.

Fig. 5 is a view similar to Fig. 1 on a reduced scale showing the sealing collar operatively installed on a pipe projecting through an angular surface.

Fig. 6 is a top plan of a modified form of sealing collar and

Fig. 7 is a central vertical section through the collar shown in Fig. 6 showing it operatively installed on a projection shown as a spike.

Referring to the drawing by reference characters I have indicated my improved sealing collar generally at 10. As shown the collar 10 includes a body portion 12 which has concentric curved inner and outer edges 13 and 13' respectively. The body 12 is shown as made of sheet metal but it may be made of any other desired and suitable material.

A portion of the body 12 is cut away as at 14 to form ends 15 and 16. Mounted on the body 12 adjacent the end 15 I provide a metal bridge or loop member 17 which is preferably secured to the body by spot welding it thereto. Mounted on the body 12 I provide a metal locking strap 18. A portion 19 of the strap 18 is secured to the body 12 by spot welding it thereto at a distance spaced inward from the end 16 of the body and the opposite end of the strap 18 extends outward beyond the body end 16.

In operation when it is desired to pack or seal around a pipe, such as indicated at 20, where it extends through a roof or other surface 21 a plastic sealing material 22 which may be mastic or other suitable material is positioned around the pipe 20 having a suitable wide base at its juncture and is shaped to a frusto-conical form with the surface 21. The collar 10 is then formed to a frusto-conical shape by moving the ends 15 and 16 towards each other.

The strap 18 is positioned between the bridge 17 and the body 12 and the end 15 of the body overlaps the end 16. The collar is then pressed firmly into engagement with the outer surface of the sealing material 22. Thereafter the collar 10 is contracted until the edge defining the aperture 13 firmly engages the outer surface of the pipe 20. The strap 18 is then bent back upon itself over the bridge 17 as clearly shown in Fig. 3 thereby locking the collar 10 in position.

As shown in Fig. 5 the collar 10 which is resilient is readily adaptable to installations wherein the axis of the object such as the pipe 23 (Fig. 5) around which packing is to be positioned extends at an angle to the surface such as indicated at 24.

In Figs. 6 and 7 I have indicated a modified form of sealing collar generally at 25. As shown the collar 25 comprises an annular metal body portion 26 which is shown as cupped and has a central aperture 27 therein. The collar 25 is resilient and is adapted to be used where it is desired to seal around a spike or other small object. When the collar 25 is used in connection with a spike such as indicated at 28 a plastic sealing material 29 similar to the material 22 is positioned in the cupped body 26 and the spike is positioned in the aperture 27 from the convex side of the body. When the spike 28 is firmly driven into an object the head thereof firmly clamps the collar to the adjacent surface 30 of the object and thereafter the collar retains the sealing material around the spike 28 and in engagement with the surface 30.

In using my improved sealing collar, I preferably fill the body portion 12 with the plastic material and then place it upon the roof after which the collar is locked. The device 12 can be readily removed and the plastic renewed should this be desired for any reason. With the old manner of sealing wherein a flat plate is placed between layers of roofing, a tight sealing effect is not secured while with my invention the sealing remains perfect as the collar holds the sealing matter in its correct position and keeps the sun and elements away from the sealing material so that the latter remains soft and retains its waterproof quality. It will be understood, of course, that my sealing device can be used where pipes pass into or out of reservoirs, tanks, etc., and into or out of walls of buildings and similar structures.

If desired I may provide a tongue 31 on the inner edge 13 and this tongue would be bent over as shown in Figs. 2 and 3 to form a downwardly facing slot in which the superimposed portion of the collar would slide so that the upper edge of the collar would not become distorted.

From the foregoing description it will be apparent that I have provided a novel packing collar which is simple in construction and highly efficient in use.

Having thus described my invention, I claim:

1. The combination of a cylindrical object extending through a surface and sealing device including plastic material surrounding said object adjacent the intersection of said object and said surface and a collar member, said collar member including a body portion made of flexible material and surrounding said plastic material in frusto-conical form with overlapping ends, a tongue on the inner of said overlapping ends, said tongue extending over the outer of said overlapping ends, a bridge member on said body adjacent one end thereof, a strap secured to said body at a point spaced from the other end of said body, the remainder of said strap extending towards the adjacent end of said body and positioned between said body and said bridge and bent back upon itself over said bridge.

2. The combination of a cylindrical object extending through a surface and a sealing device including plastic material surrounding said object adjacent the intersection of said object and said surface, and a collar member, said collar member including a body made of flexible material and surrounding said plastic material in frusto-conical form with the upper edge engaging the cylindrical object and the lower edge engaging the surface and with one end under the other so that the ends are overlapping and in sliding engagement, a flexible strap secured near one end of said body and a strap engaging portion at the other end of said body and adapted to engage said strap.

EDGAR M. TUCKER.